Patented June 22, 1954

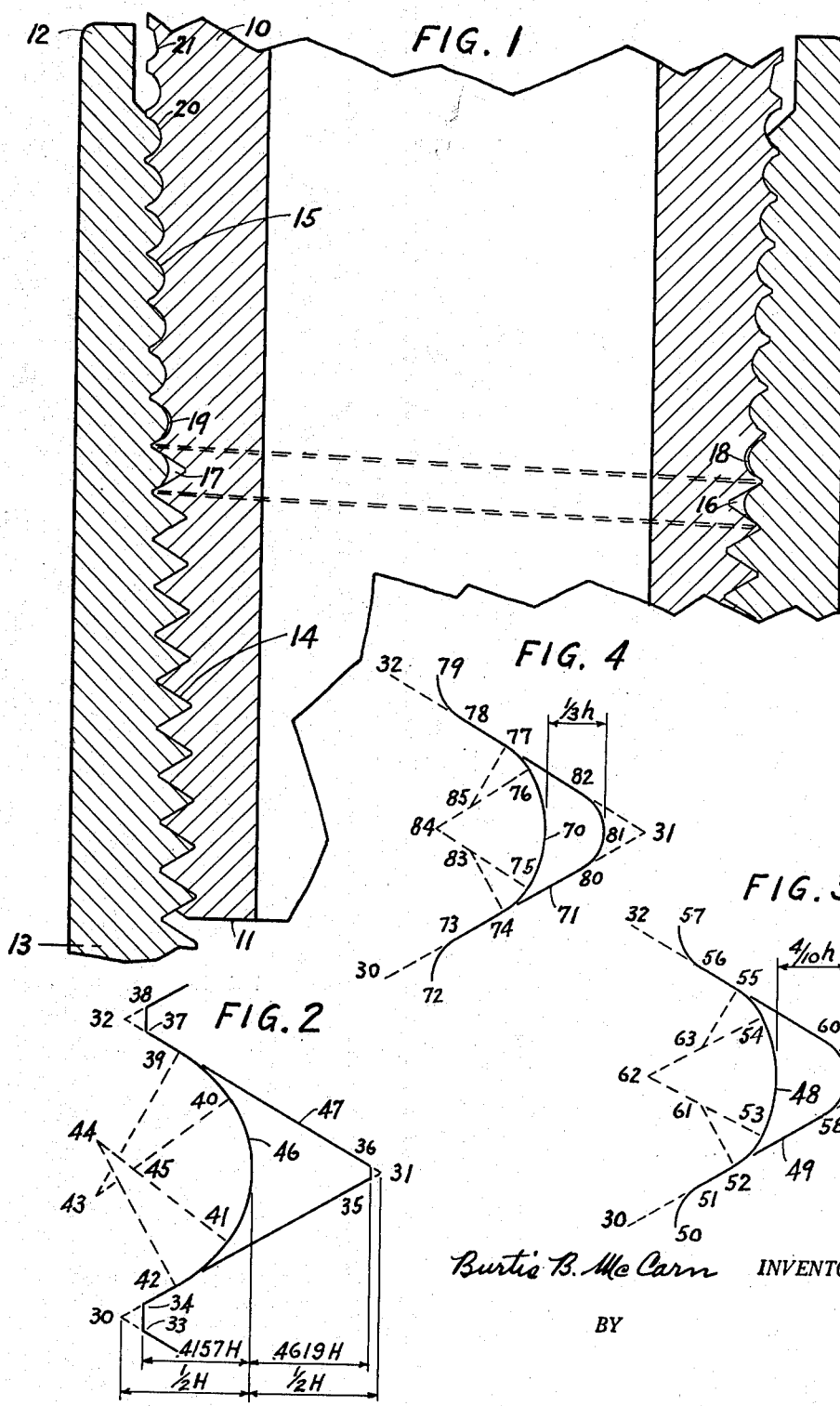

2,681,815

UNITED STATES PATENT OFFICE 2,681,815

THREADED COUPLING MEANS FOR TUBES HAVING MULTIPLE TYPE THREADS AND TRANSITIONAL THREAD MEANS THEREBETWEEN

Burtis B. McCarn, Jersey City, N. J.

Application December 10, 1951, Serial No. 260,869

2 Claims. (Cl. 285—146)

This invention has to do with the means or instrumentality for coupling or uniting a junction of two ends respectively of two tubular members, to provide increased length of tubing, and is more particularly concerned with such coupling means for tubular goods for use in connection with the drilling and producing operations for oil wells and the like. The principal object of the invention is to provide such coupling means having increased strength to resist shock loading, high tensile stresses or flexural stresses, or a combination of such stresses, without increased expense for materials or labor and without occupying more space, all as compared with the most nearly similar devices of the prior art. Another object is to provide a threaded coupling means for tubes, such that certain internal threads in the coupling member thereof, that will be first contacted by another member when the coupling member is put to use, will have increased suitability for common methods of thread treatment to minimize galling, such as heat treatment or electroplating. Other objects will appear from the detailed description of the invention.

This application is a continuation-in-part of my copending application Serial No. 559,340, filed October 19, 1944, now Patent 2,577,789, issued December 11, 1951, for Hangers for Trolley Rails. The said application shows and describes, and originally claimed, a novel threaded fastening of a general thread-and-nut style, applied to a trolley-rail hanger, and having unusual utility for resisting shock loading and tensile stress combined with flexural stress; operating by means of a shallow-depth screw thread continuing from a full-depth thread; the nut for the shallow-depth thread turning across the full-depth thread to reach its position of use; and the shallow-depth thread affording greatly increased strength without any additional expense for materials or labor. The original invention is readily and clearly applicable to most of the commonly used load-bearing or force-transmitting threaded joint constructions. The invention has nowhere been claimed broadly, and is claimed in the present application only as applied to coupling means for tubes.

A threaded fastening including at least two different nuts in combination with one full-depth thread and one continuing shallow-depth thread, is claimed in my copending application Serial No. 702,771, filed October 11, 1946, for Adjustable Clamping and Locking Means, the said application being also a continuation-in-part of the said application Serial No. 559,340.

A subcombination of what is designated the preferred form of the Adjustable Clamping and Locking Means of the said application Serial No. 702,771, is claimed in my copending application Serial No. 170,221, filed June 24, 1950, for Threaded Fastenings, the latter application being also a continuation-in-part of the said application Serial No. 559,340.

In this specification the term "coupling means" will designate an instrumentality for connecting one end of a long tube or pipe to one end of a coupling member. The coupling member would be intended to join two tubular members to provide a tubular member of increased length. In its position of ultimate use, the coupling member would provide parts of two "coupling means," one at each of its two ends respectively. For the use of my invention, at least one of the said two coupling means would be as disclosed in this application. The second one could be made by a duplication of the first, or it could be made by some well known means or aggregations of the prior art. The preferred form of the said aggregations would be a common threaded coupling means plus common welding. The term "coupling" used as a noun, will mean a sleeve or coupling member intended for use in the general manner of a common pipe coupling. Other terms used in this specification, will have the meaning per the presently current edition of "American Standard Pipe Threads" ASA-B2.1—1945, the applicable standard of the American Petroleum Institute, or Day's "Handbook of the Petroleum Industry," respectively. "Depth of thread" and "height of thread" will have the same meaning. When an external thread is said to "fit operatively" an internal thread, the meaning is that it has a suitable fit for operation or practical use in the manner of matching threads for the structure in which it is used; the two threads are complementary except for common clearances and tolerances which would be designated and specified in usual ways. The invention is independent of all the common characteristics usually specified for the fit of matching threads; but every embodiment of the invention does have external and internal threads which fit each other operatively. The adjective "proposed," as used in "the proposed coupling means," and in "the proposed special thread," will mean proposed in the invention claimed in the present application.

In the drawings, Fig. 1 illustrates a partial cross section on a plane through the center line of a coupling means for tubes according to one embodiment of the invention, namely the application of the invention to a coupling for line pipe; but the thread is drawn to enlarged size and reduced length, the taper is exaggerated, and the diameter of the tube or pipe is drawn to reduced size, for illustrative purposes.

Fig. 2 is a diagram showing, in enlarged size and with the effect of the taper omitted, the thread profile of the special thread of Fig. 1, compared with the profile of a standard line-pipe thread form, the center line of the tube and the coupling being to the right hand side of the thread profiles shown and in the same plane.

Fig. 3 is a diagram showing, in enlarged size and with the effect of the taper omitted, another thread profile suitable for the special thread of the coupling means for tubes of my invention. Also shown, for comparative purposes, is a profile of the American Petroleum Institute's casing, tubing and drill-pipe thread form. The profile for the special thread has a reduction in height of thread as compared with the said casing thread form, amounting to $\frac{7}{10}$ths or 40 per cent.

Fig. 4 is a diagram like Fig. 3 except that the said reduction in height amounts to one third.

The diagram of Fig. 2 illustrates a shallow or partially formed thread 46 compared with a fully formed thread 47 to show how thread 46 may provide a rounded form at the root of the thread and also leave a greater sectional area of tube at the root of the thread, each feature providing a stronger device for resisting tension and flexure at the critical section of the device, namely at the root of the last engaged thread of the tube, as compared with corresponding features of a fully formed thread. The partially formed thread can be made more economically than a fully formed thread Thread 14 of Fig. 1, or thread 47 of Fig. 2, illustrates the thread form for API Standard Line Pipe. The ASA American Standard Taper Pipe Thread is very similar with slight variations for truncation at crest and root. Such threads are of practicably the same size and shape as ancient threads and early standardized threads of the art. Properties of the metals used and methods of thread making had improvements of long standing at the time my invention was disclosed in my said application Serial No. 559,340, and developments in the direction of my invention were possible and were needed. The utility of my subcombination of an external screw thread with a rounded root profile combined with a substantial reduction in the height of the thread in proportion to the pitch, is proved by the characteristics of screw thread standards adopted subsequent to the date of my said application Serial No. 559,340, filed October 19, 1944; the Unified Screw Thread Standards, National Bureau of Standards Circular 479, were adopted November 18, 1948; the API Std. 5A, Specification for Casing, Tubing, and Drill Pipe, showed sharp threads in 1944, but those sharp threads have been superseded by round-form threads of reduced height. The invention claimed in the said application Serial No. 559,340, is obviously applicable to a structure including any common load-bearing or force-transmitting thread such as those already mentioned, Acme threads, buttress threads, Whitworth threads and various threads derived from the Whitworth style.

Figs. 1 and 2 show the preferred form of the invention as applied to common steel pipe or to line pipe. The special thread 15 of Fig. 1 or 46 of Fig. 2 is shown to have a substantial reduction in the depth of the thread as compared with the common depth for a standard thread having the same pitch and the same crest profile. The said substantial reduction in depth may vary within wide limits for general purposes and may be varied effectively for various special purposes, this being an important advantage of the invention, but I do not claim as substantial any reduction amounting to less than one-third of the basic thread depth. In the preferred form of the device of Figs. 1 and 2, the said substantial reduction is in the general proportion of one-half of the basic thread depth; slightly less than one-half is preferable to slightly more than one-half of the basic thread depth. A reduction of one-third of the basic thread depth would provide the advantages of the invention, but in a minimum degree as to increased net area at the root of the external screw thread.

In Figs. 2, 3 and 4, the profile of the sharp V thread is indicated by lines through points 30, 31 and 32. "H" of Fig. 2 designates the depth of the sharp V thread. In Fig. 2, 47 designates the thread profile drawn through points 33, 34, 35, 36 and 37; as shown by the truncation, 47 indicates the profile of an external screw thread; and thread 47 would continue through point 38. The thread profile of thread 14 on the tube of Fig. 1, if enlarged correspondingly, would be the same as 47. The coupling 12 of Fig. 1 would have internal threading formed to match operatively the external thread 14 on the tubular member 10; and inasmuch as Fig. 1 designates API standard line pipe, the clearances, fit and tolerances would preferably be in accordance with API standard 5L dated March, 1951. In Fig. 2, 46 designates the thread profile drawn through points 33, 34, 42, 41, 40, 39 and 37; 46 has crests like 47, and indicates the profile of an external screw thread; and thread 46 would continue through point 38. The thread profile of thread 15 on the tube of Fig. 1, if enlarged correspondingly, would be the same as 46. The coupling 12 of Fig. 1 would have internal threading formed to match operatively the external thread 15 on the tubular member 10; the clearance, fit and tolerances at the crest of 15 would be the same as at the crest of 14; and the clearance at the root of 15 would be crescent shaped, similar to the standard clearance for casing, tubing, and drill pipe as produced by API standard 5A dated June, 1950; but to fit the profile 46 most efficiently, the crescent would preferably be relatively longer and flatter than standard, the clearance between the root of the external thread and the crest of the internal thread being preferably the same as that of standard threading for the same use.

The preferred use of the invention is for tubular products such as have eight threads per inch.

Figs. 3 and 4 illustrate the preferred forms of the invention as applied to API standard casing, tubing, or drill pipe. If necessary to specify the single preferred form for this application generally, it would be that of Fig. 3. Figs. 3 and 4 are to be interpreted as nearly as possible in the manner Fig. 2 has been interpreted. 49 and 71 are drawn alike and represent the same standard thread form, namely the casing, tubing, and drill-pipe thread form as specified in the API standard 5A, sixteenth edition, dated June 1950, and published by the American Petroleum Institute; but they are distinguished by different numbers because they have, respectively, points in common with different thread profiles. "$h$" is the basic depth of the said standard thread form.

In Fig. 3, 49 designates the thread profile drawn through points 50, 51, 52, 58, 59, 60, 55, 56 and 57; and as shown by the truncation, 49 indicates the profile of an external screw thread. 48 designates the thread profile drawn through points 50, 51, 52, 53, 54, 55, 56 and 57; 48 has crests like 49, and indicates the profile of an external screw thread. One embodiment of the invention can be formed by substituting a thread style like 49 for 14 and a thread style like 48 for 15, in Fig. 1; the coupling would preferably be longer and there would be more threads of the standard style and more threads of the special style; it is well known that standard short-thread casing couplings are longer than standard couplings for line pipe of similar diameter, and the standard long-thread casing couplings are considerably longer than short-thread casing couplings. In general, the longer the coupling, the more obvious are the advantages of the invention, because one-half of the length of the threading on casing designed for long-thread couplings, is obviously enough to develope the tensile strength of the casing at the last engaged thread, and the special thread of the invention is at least as good as an equal length of the standard thread for preventing washouts due to leakage through a coupled joint.

Thread 48 has a flatter curve at the root than thread 49. This fact has a favorable effect when the invention is applied to a coupling means that is to be so highly stressed in use as to cause extreme elastic deformation of the coacting external and internal special threads; the relatively longer and flatter curve does not require so much deformation of metal to close the same maximum clearance, as in the standard style of 49; and the flow of tensile stress occurs on the flatter curve in a manner that is less destructive to the coupling means, as compared with the flow of tensile stress on a curve like 49.

In Fig. 4, 71 designates the thread profile drawn through points 72, 73, 74, 80, 81, 82, 77, 78 and 79; and as shown by the truncation, 71 indicates the profile of an external screw thread. 70 designates the thread profile drawn through points 72, 73, 74, 75, 76, 77, 78 and 79; 70 has crests like 71 and indicates the profile of an external screw thread. One embodiment of the invention can be formed by substituting a thread style like 71 for 14 and a thread style like 70 for 15, in Fig. 1; the coupling would preferably be longer and there would be more threads of each of the two principal styles, than in Fig. 1.

Fig. 1 shows how transition may be made, at the root portions of the external screw thread, between the full-depth threading at 14 and the shallow-depth threading at 15. It is necessary to thread and tap the parts of the coupling means so as to avoid jamming at the transition parts prior to arrival of the threads 14 and 15 at their final positions after power-tight make-up. In the proposed structures, there will preferably be a transition part similar to a vanish cone but varying the thread depth only from full standard depth to a lesser depth. A standard vanish cone applied to common threading causes the thread depth to vanish in a length of about three times the pitch, varying the thread depth from full standard depth to zero depth. By comparison, the proposed transition part would tend to have a length of about two times the pitch. For most uses, it would be desirable to provide more clearance between external and internal threading at the transition part, than at the standard and special threads, and to otherwise thread and tap the parts, to avoid jamming at the transition part prior to arrival of the standard and special threads at their final positions after a power-tight make-up. The standard thread would have standard fit, clearance and tolerances for its purpose; the special thread would have similar characteristics similarly designed; and the transition part would preferably have similar characteristics at the root of the external thread and at the corresponding crest of the internal thread, with a greater degree of clearance. The said greater degree of clearance could be provided by spaces such as 16, 17, 18 and 19 of Fig. 1. These spaces may be varied and should be designed to suit methods of manufacture and requirements of use.

In any embodiment of the proposed coupling means, the shallow-depth special thread will continue uniformly from the full-depth free-ended thread on the tube, as to pitch and thread profile at the crest and adjoining the crest. In effect, the said two thread styles will form one continuous thread at and adjoining the crest of the external thread. The full depth of the free-ended thread will preferably merge gradually into the shallow depth of the special thread by means of a transition cone used like a standard vanish cone except that it continues only from the root diameter of the full depth thread to the root diameter of the shallow-depth thread; but for the general purposes of my invention, the change from full depth to shallow depth could be abrupt; and the rate of change used may depend upon reasons not related to the invention. Taking account of tolerances related to the relative positions of the plane of vanish point of the external thread and the face of coupling, for basic power-tight make up, the transition cone for the external thread should be located sufficiently nearer the said plane of vanish point, than the corresponding transition cone for the internal thread, so that the final positions of the threaded members will not be limited by contact (or jamming), of parts of the structure related to the two transition cones. In other words, the proposed coupling means should be made so that the crest portions of the external thread and the root portions of the internal thread, if of a specifically designated standard style, should function as nearly as possible in accordance with all details of the designated standard, without any limitation being imposed by the special transition parts. A coupling means made to use the thread profiles of Fig. 3 would not have any spaces like 16 or 17 of Fig. 1, because each and every one of the clearance spaces would be crescent shaped like spaces 18 and 19 of Fig. 1. Modern methods of manufacture would permit making such crescent shaped spaces very thin, and this is desirable.

In Fig. 1, the center of the coupling 12 is located by 13 which designates a mid-point in the length of the coupling. 11 indicated the extreme end of the tubular member.

It is well known that retention of control of a very long string or length of casing, tubing or drill-pipe, and hence the continuation of well drilling operations, frequently depends upon the strength of a tubular member at the root of the last engaged thread in some single coupling means. In the case of a "dry hole," "frozen string" or exhausted well, the salvaging of many tons of casing frequently depends upon the same sort of strength. A coupling means for tubes is ordinarily made as an article of manufacture, by quantity production methods, without knowledge of the exact location and circumstances of its use. It is anticipated that a manufactured quantity of like coupling means will be subjected to various uses by common methods of design and practice and that some will be subjected to very severe stresses. The desirability of increased strength, without increased expense nor increased space requirements, is therefore obvious. Each of the proposed constructions can provide a substantial amount of increased strength without any increased expense or space requirement.

In a long string of casing, the total length, weight or value of the couplings, is small as compared with corresponding figures for the tubular members of the string. It is common practice to use alloy steel for the couplings, such as to give them greater strength than they would have if made of the same grade of steel as that of the particular tubular members with which the couplings are to be used, and to electroplate or otherwise treat the threads of the couplings. The proposed structures are adaptable to such practice. The proposed special thread profile is superior for receiving and retaining electroplating.

Line pipe is sometimes used for the purposes of tubing, and of casing. In such an event, the structure of Fig. 1 could provide increased strength where urgently needed.

If necessary to designate the preferred use of the invention claimed in this application, it is the use for standard casing as described with reference to Fig. 3.

The drawings illustrate one structural embodiment of the invention claimed in this application, and some derived variations particularly suitable for the subcombination of a special external screw thread having a rounded form at the root of the thread and a shallow depth of thread in proportion to the pitch and crest sizes. The said invention consists of a new combination of elements. Of the said elements, old ones each with well known advantages are: a tubular member and at the free end thereof a length of external screw thread having a commonly used thread form for the particular tubular member under consideration; and a coupling member properly dseigned in all its various details to fit operatively the said tubular member. The said new combination includes a novel subcombination consisting of a shallow-depth external screw thread with a standard or typical guiding crest and a rounded root combined with a substantial reduction in the thread depth relative to the pitch and relative to the depth of an adjoining full-depth or standard-depth thread, and the said shallow-depth thread continuing from the said full-depth thread with the same pitch and the same thread profile at the crest and at flank portions adjoining each side of the crest.

The preferred form of the said combination consists of: a tubular member having at its free end an external screw thread of a common standard profile for the said tubular member and of length at least sufficient to develope the full tensile strength of the said tubular member at the root of the said thread but of length equal to about one-half of the most commonly used length of thread for the said tubular member and its common costandardized coupling; a special external screw thread as above described, of practicably the same length as the length of standard thread used with it, and continuing from the standard thread as above described; and a coupling formed to fit operatively all of the threading.

Entirely special threads have been used for various purposes in the joints of oil field tubular goods. It is an advantage of the proposed coupling means that it can use, and in the preferred form does use, a length of common standard thread for the particular item of tubular goods dealt with, and that the continuing special shallow-depth thread has a profile like that of the said standard thread at the crest of the external screw thread and at flank portions adjoining the said crest. This provides the special thread with desirable characteristics of the standard thread which have been developed by trial throughout the prior art, for guiding the external thread when turned into the internal thread, and for providing a fluid-tight and gas-tight joint.

The rounded profile at the root of the special external screw thread of the proposed combination is preferably of parabolic shape. The curve 39, 40, 41, 42, is shown formed by two radii of equal length as from 41 to 44 and 39 to 43, and by one shorter radius of length from 40 to 45; such a curve can be so made as to approximate a parabola closely enough for practicable use, and might be more easily controlled during manufacturing processes. The curve 52, 53, 54, 55, is shown formed by two radii of equal length as from 52 to 61 and 55 to 63, and by one longer radius of length from 53 to 62; in general, such a combination of radii provides longer common standard flank portions adjoining the crest of the external screw thread, than would be provided by the style of rounded root formed by two longer radii and one shorter radius; this would be advantageous, if both root and crest are to be rounded, for guiding the external and internal threads into a coupled joint. The rounded profile at the root of the special external screw thread may be in the form of a circular arc; or it may be formed by any combination of arcs and chord-like elements which approximate a smooth curve closely enough to serve the purposes of the device.

Referring to screw threads generally, it is of primary importance that the shearing strength of engaged threads, in an axial direction, shall be at least as great as the axial tensile strength of the threaded member. The standardized couplings such as API short-thread casing couplings, and API long-thread casing couplings, each have an effective length of thread engagement with each tubular member such as to provide more than twice the length required to prevent failure by simple shear. In the preferred form of the proposed structures, one half of the effective length of threading has full-depth threads, and the other half has shallow-depth threads. The effective length of threading for my device, is greater than the corresponding length for standard construction throughout, by about two threads; because the vanish cone of my device is shorter, due to the shallow depth of the special thread. An illustration of this fact is indicated at 20 and 21 in Fig. 1. It is possible for my device to use couplings of standard length, diameter and thickness, and still provide enough full-depth thread to resist simple shear, and also enough shallow-depth thread to resist simple shear. It is an advantage of the proposed device, that each of the full-depth and shallow-depth threads functions in a common manner; the said two styles of thread are also constrained to function together, because each continues from the other with the same crest contour and flank portions adjoining the two sides of the crest.

A full-length vanishing thread is not claimed in this application, meaning a thread with a continuously varying depth of thread. A full-length vanishing thread can not provide a structure equivalent in strength to the structure of my invention, because the engagement is of different area and on a varying pitch diameter, for each thread as compared with adjoining and nearby threads, and therefor the individual threads of the series would be expected to fail in different ways and by concentrations of stress due to varying elastic characteristics. The strength of a full-length vanishing thread could not be computed by usual methods.

A favorable result of using the proposed coupling means, is that the make-up or procedure of joining the threaded end of the tube with the tapped end of the coupling, can be made by lateral contact of the external and internal threads. This procedure is an improvement over stabbing, as regards damage to threads. It is possible because of the shallow-depth internal threading at the end of the coupling; the make-up would be between external threading like 14 and internal threading like 15. It would be possible to design a simple mechanism to guide the tubular member prior to contact of the threads.

An application of the proposed improvement to a casing six and five-eighths inch outside diameter, 20.00 pounds per foot nominal weight, and threaded with casing thread per API std. 5A with 8 threads per inch, will now be evaluated, by the following simple approximation. The inside diameter is 6.049" and the standard thread depth is 0.07125". The area of the unthreaded casing is 5.7337 sq. in. The area at the root of the last engaged thread is 4.2664 sq. in. According to the commonly used formula, the threading reduces the tensile strength of the structure 25.6 per cent. Using a half-depth thread, the like computation would show a reduction in tensile strength of 12.88 per cent. In this case, the efficiency of the proposed construction, as compared with the commonly used construction, is 199 per cent. For other proportionate reductions in thread depth, and for other sizes of casing, the advantages of the proposed improvement are of different proportions, but are always substantial. The methods of use of the tubular structures under consideration, are such that even a small proportionate increase in strength is greatly to be desired.

An external screw thread of the general style of 15, 48 or 70 is very favorably shaped for pressure forming, or for any common methods of manufacture. Threads 14 and 15 could first be formed like 15 and could be efficiently made into the final form of the structure by an additional operation on threads 14 and the transition threads.

It will be obvious to those skilled in the art of threaded fastenings that the invention is not limited to the illustrative embodiments shown and described. The claims are intended to cover all modifications which do not involve a departure from the spirit and scope of my invention.

I claim:

1. A coupling means for tubes wherein one end of a tubular member is joined to one end of a coupling member by thread-fastening means, comprising: a tubular member having a free end suitable for threading as with a common external screw thread; a free-ended external screw thread on the said member at and adjoining the said free end thereof, the said free-ended thread consisting of a ridge of uniform profile and in the form of a helix on the external surface of a truncated cone, and the said free-ended thread having throughout its length, a uniform pitch, a uniform depth-of-thread and a uniform rate of taper; a special external screw thread on the said member and adjoining the said free-ended thread, the special thread continuing from the free-ended thread with practicably the same pitch, the same rate of taper at its major diameter, and the same form of thread-profile at the crest of the thread and at the portions of the flanks of the thread adjoining the crest, as for the free-ended thread; the special thread having, throughout the intermediate and major portion of its length, a depth-of-thread substantially smaller than the said depth-of-thread of the free-ended thread, being at least one-third less in depth; the special thread having a rounded profile at the root of the thread; the special thread having, at its end portion adjacent to the free-ended thread, a transition part whose depth-of-thread varies and decreases from a size slightly larger than the said depth-of-thread of the free-ended thread to a depth-of-thread equal to and merging into the said depth-of-thread of the special thread; the length of the special thread being similar to the length of the free-ended thread, such that the variation between the said two lengths is limited to not more than one-half of the shorter length; and a coupling member having at least one end provided with internal threading such that the said threading can be caused to match operatively and simultaneously at least the major portion of the length of the said free-ended thread and at least the major portion of the length of the said special thread.

2. A coupling means according to claim 1, and the length of the said transition part being very short.

References Cited in the file of this patent

UNITED STATES PATENTS

| Number | Name | Date |
|---|---|---|
| 135,898 | English | Feb. 18, 1873 |
| 2,161,568 | Gignoux | June 6, 1937 |
| 2,267,923 | Johnson | Dec. 30, 1941 |
| 2,311,329 | Caminez | Feb. 16, 1943 |